(12) United States Patent
Lee et al.

(10) Patent No.: US 11,358,280 B2
(45) Date of Patent: Jun. 14, 2022

(54) METHOD, DEVICE, AND PROGRAM FOR PROCESSING SIGNALS

(71) Applicant: HANWHA CO., LTD., Seoul (KR)

(72) Inventors: Jin Jae Lee, Changwon-si (KR); Byung Hoon Lee, Changwon-si (KR); Jin Soo Kim, Changwon-si (KR)

(73) Assignee: Hanwha Co., Ltd., Seoul (KR)

( * ) Notice: Subject to any disclaimer, the term of this patent is extended or adjusted under 35 U.S.C. 154(b) by 154 days.

(21) Appl. No.: 16/831,280

(22) Filed: Mar. 26, 2020

(65) Prior Publication Data

US 2020/0223067 A1 Jul. 16, 2020

Related U.S. Application Data

(63) Continuation of application No. PCT/KR2018/011454, filed on Sep. 27, 2018.

(30) Foreign Application Priority Data

Sep. 29, 2017 (KR) .......................... 10-2017-0128316

(51) Int. Cl.
*B25J 9/16* (2006.01)
*G06F 13/20* (2006.01)
*G06F 13/38* (2006.01)
*G05B 19/04* (2006.01)
*G06F 13/14* (2006.01)

(52) U.S. Cl.
CPC ............ *B25J 9/1689* (2013.01); *G06F 13/20* (2013.01)

(58) Field of Classification Search
CPC .................................. G06F 19/00; H04J 3/00
See application file for complete search history.

(56) References Cited

U.S. PATENT DOCUMENTS

| 4,845,627 A | 7/1989 | Nadolski et al. |
| 7,443,886 B1 * | 10/2008 | Gross .................... G06F 13/385 370/476 |
| 2007/0150096 A1 * | 6/2007 | Yeh ...................... G05D 1/0259 700/245 |

(Continued)

FOREIGN PATENT DOCUMENTS

| KR | 10-1999-0009110 A | 2/1999 |
| KR | 10-2000-0023811 A | 4/2000 |

(Continued)

OTHER PUBLICATIONS

International Search Report (PCT/ISA/210), issued by International Searching Authority in corresponding International Application No. PCT/KR2018/011454, dated Dec. 26, 2018.

(Continued)

*Primary Examiner* — Getente A Yimer
(74) *Attorney, Agent, or Firm* — Sughrue Mion, PLLC

(57) ABSTRACT

A method of processing control signals using a plurality of ports of a robot control device is provided. The method may include determining a logic signal of each of the plurality of ports corresponding to an N-bit signal frame; generating a port setting bit for determining whether to use each of the plurality of ports corresponding to the N-bit signal frame based on an order of the plurality of ports; generating a result bit by performing a bit operation on the logic signal of each of the plurality of ports and the port setting bit; and processing a first signal based on the result bit.

15 Claims, 3 Drawing Sheets

(56) References Cited

U.S. PATENT DOCUMENTS

| | | | |
|---|---|---|---|
| 2010/0189003 A1 | 7/2010 | Kozuka | |
| 2011/0260752 A1 | 10/2011 | Jouin et al. | |
| 2012/0151435 A1 | 6/2012 | Briden et al. | |
| 2020/0018819 A1* | 1/2020 | Beck | G01S 5/16 |
| 2020/0186420 A1* | 6/2020 | Yoneda | H04L 67/32 |
| 2020/0341435 A1* | 10/2020 | Nakagawa | G06F 9/542 |

FOREIGN PATENT DOCUMENTS

| | | |
|---|---|---|
| KR | 10-0557395 B1 | 3/2006 |
| KR | 10-2006-0125191 A | 12/2006 |
| KR | 10-2007-0071484 A | 7/2007 |
| KR | 10-2008-0010022 A | 1/2008 |
| KR | 10-2011-0077542 A | 7/2011 |
| KR | 10-1151361 B1 | 6/2012 |

OTHER PUBLICATIONS

Written Opinion (PCT/ISA/237) issued by the International Searching Authority in corresponding International Application No. PCT/KR2018/011454, dated Dec. 26, 2018.

Communication dated May 21, 2021, from the European Patent Office in European Application No. 18861911.8.

* cited by examiner

METHOD, DEVICE, AND PROGRAM FOR PROCESSING SIGNALS

CROSS REFERENCE TO THE RELATED APPLICATION(S)

This application is a continuation of International Patent Application No. PCT/KR2018/011454 filed on Sep. 27, 2018, which claims priority from Korean Patent Application No. 10-2017-0128316 filed in the Korean Intellectual Property Office on Sep. 29, 2017, which are incorporated herein by reference in their entireties.

BACKGROUND

1. Field

Methods and apparatuses consistent with the embodiments of the inventive concept relate to signal processing.

2. Description of Related Art

With the rapid development of technology, robots play an important role as tools for performing various tasks instead of humans. Robots are used primarily for the automation of many types of tasks such as logistics, assembly, welding, painting, and so on in manufacturing production lines, instead of human effort, thereby contributing to increased productivity.

As part of an effort to implement automations by robots, a robot exchanges signals with an external device through an input/output port, and the number of such ports may be generally limited due to the physical size of a robot control device.

Therefore, if the number of required data transmission/reception channels exceeds the number of ports included in a robot control device, the conventional robot control device changes or switches to another robot control device with more ports or uses a separate extension module in connection with the robot control device.

However, the change of a robot control device or the use of a separate extension module not only increases the operating cost of a system, but also increases the complexity of the system and causes considerable losses by consuming more time for reorganizing the system.

SUMMARY

The embodiments of the inventive concept provide a signal processing method, device, and computer program capable of processing a large amount of signals even with a limited number of ports by combining a plurality of channels organically without changing a robot control device or using a separate extension module if the number of required data transmission/reception channels is more than the number of ports included in the robot control device.

In particular, the embodiments provide a signal processing method, device, and computer program that may process more signals than the signals that can be processed by a certain number of ports by merging the logic signals of a plurality of ports in parallel.

In addition, the embodiments provide a signal processing method, device, and computer program that merge and use the logic signals of a plurality of ports in parallel, simultaneously process signals more than the number of ports, increase the usability of unused ports, and enable the port to be used more efficiently.

According to an embodiment, there is provided a method of processing control signals using a plurality of ports of a robot control device. The method may include: determining a logic signal of each of the plurality of ports corresponding to an N-bit signal frame; generating a port setting bit for determining whether to use each of the plurality of ports corresponding to the N-bit signal frame based on an order of the plurality of ports, N being a natural number; generating a result bit by performing a bit operation on the logic signal of each of the plurality of ports and the port setting bit; and processing a first signal based on the result bit.

The generating of the port setting bit may include: generating the port setting bit as 1 for indicating a used port among the plurality of ports, and generating the port setting bit as 0 for indicating an unused port among the plurality of ports.

The number of the plurality of ports is N, and when a number of ports being used among the plurality of ports is U (where, N>=U and U is a natural number), the result bit is 2 to a power of U (2U).

After the processing of the signal, the method may further include processing a second signal by an unused port among the plurality of ports.

The processing of the second signal by the unused port may further include separately processing by each of a plurality of unused ports regardless of the N-bit signal frame and the port setting bit.

A plurality of unused ports are not adjacent to each other.

The processing of the first signal may further include generating an output signal, and the generating of the result bit may further include generating an output signal bit by performing the bit operation on the logic signal of each of the plurality of ports generated internally and the port setting bit.

The processing of the first signal is obtaining of an input signal, and the generating of the result bit may further include generating an input signal bit by performing the bit operation on the logic signal of each of the plurality of ports obtained from an external device and the port setting bit.

According to an embodiment, there is provided a non-transitory computer readable medium storing a program, when executed by a computer, configured to perform the method of claim 1.

According to an embodiment, there is provided a robot control device for processing control signals using a plurality of ports. The robot control device may include a controller configured to: determine a logic signal of each of the plurality of ports corresponding to an N-bit signal frame, N being a natural number; generate a port setting bit for determining whether to use each of the plurality of ports corresponding to the N-bit signal frame based on an order of the plurality of ports; generate a result bit by performing a bit operation on the logic signal of each of the plurality of ports and the port setting bit; and process a first signal based on the result bit.

The controller is further configured to: generate the port setting bit as 1 for indicating a used port among the plurality of ports, and generate the port setting bit as 0 for indicating an unused port among the plurality of ports.

The number of the plurality of ports is N, and when a number of ports being used among the plurality of ports is U (where, N>=U and U is a natural number), the result bit is 2 to a power of U (2U).

The controller is further configured to process a second signal by an unused port among the plurality of ports after processing the first signal.

The controller is further configured to separately process each of a plurality of unused ports regardless of the N-bit signal frame and the port setting bit.

A plurality of unused ports are not adjacent to each other.

The controller is further configured to: generate an output signal, and generate an output signal bit by performing the bit operation on the logic signal of each of the plurality of ports generated internally and the port setting bit.

The controller is further configured to: obtain an input signal, and generate an input signal bit by performing the bit operation on the logic signal of each of the plurality of ports obtained from an external device and the port setting bit.

According to embodiments, it may be possible to implement a signal processing method, device, and computer program capable of processing a large amount of signals even with a limited number of ports by combining a plurality of channels without changing a robot control device or using a separate extension module if the required number of data transmission/reception channels is greater than the number of ports included in the robot control device.

In addition, it may be possible to implement a signal processing method, device, and computer program that merge and use the logic signals of a plurality of ports in parallel, simultaneously process signals of more than the number of ports, increase the usability of unused ports, and enable the port to be used more efficiently.

DETAILED DESCRIPTION

The embodiments described hereinbelow are all exemplary, and thus, various modifications are possible in the embodiments, which are illustrated with reference to the accompanying drawings. In the following description, when it is determined that the detailed description of the related known technology may obscure the gist of the present disclosure, the detailed description thereof will be omitted.

It may be understood that the terms "first" and "second" are used herein to describe various components but these components should not be limited by these terms. These terms are used only to distinguish one component from other components.

Terms used in herein are used to describe specific embodiments, and are not intended to limit the scope of the present disclosure. The terms of a singular form may include plural forms unless indicated otherwise. The term "include," "comprise," "including," or "comprising," specifies a property, a region, a fixed number, a step, a process, an element and/or a component, but does not exclude other properties, regions, fixed numbers, steps, processes, elements and/or components.

Figure 1:
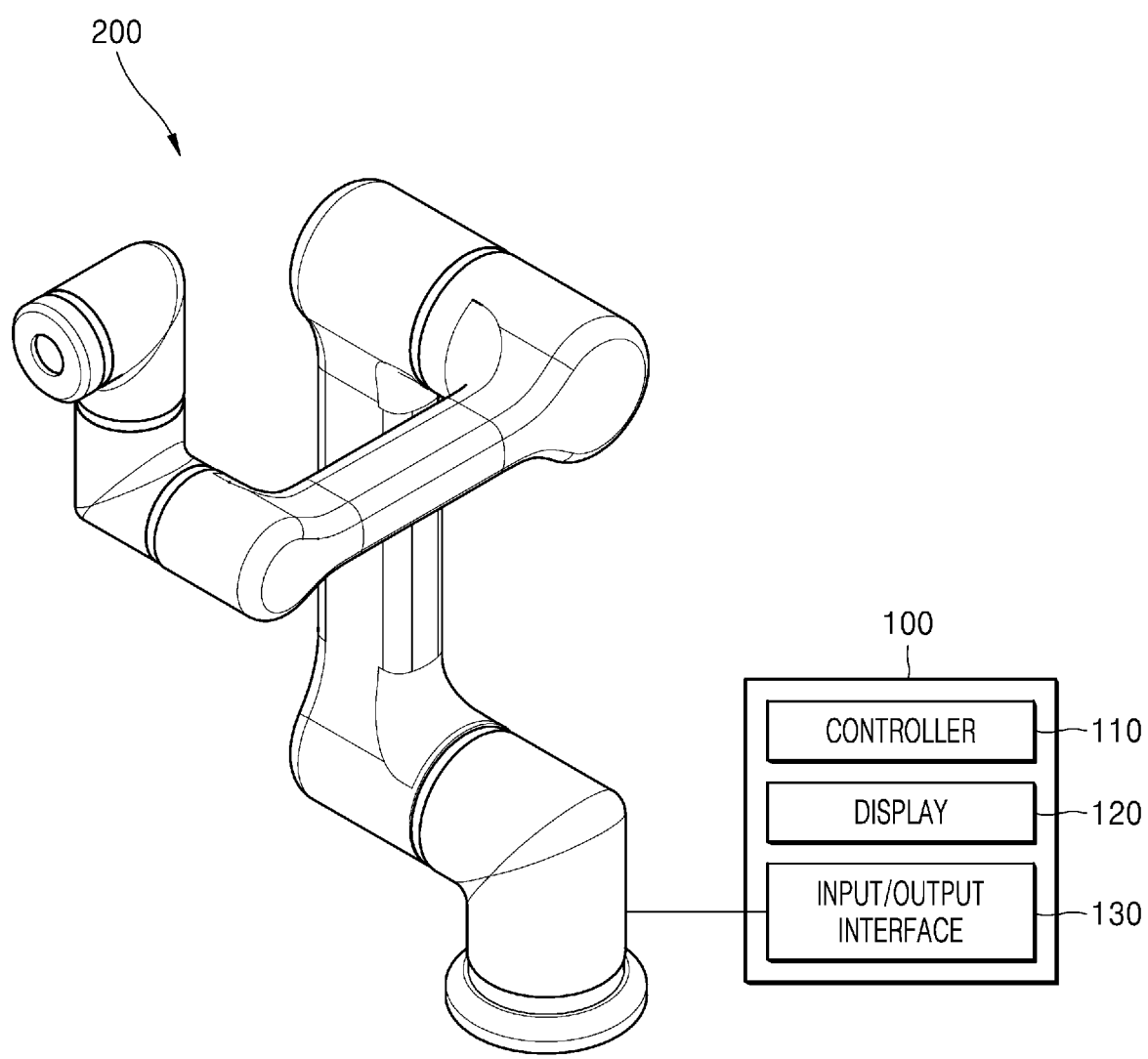
FIG. 1 is a schematic diagram illustrating a robot system according to an embodiment.

At least one of the components, elements, modules or units (collectively "components" in this paragraph) represented by a block in the drawings such as a controller 110 in FIG. 1 may be implemented in various numbers of hardware or/and software configurations that perform particular functions. For example, the component may employ integrated circuit configurations such as a memory, a processor, a logic circuit, a look-up table, and the like, which are capable of executing various functions by the control of one or more microprocessors or other control devices. The component may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like.

FIG. 1 is a schematic diagram illustrating a robot system according to an embodiment.

Referring to FIG. 1, a robot system according to an embodiment may include a robot control device 100 and a robot 200.

The robot 200 may be a device including one or more actuators and one or more parts. The actuator may refer to various devices for converting electrical energy into kinetic energy based on a control signal. For example, the actuator may be any one of a direct current (DC) servo motor, an alternating current (AC) servo motor, a stepping motor, a linear motor, a hydraulic cylinder, a hydraulic motor, a pneumatic cylinder, and a pneumatic motor. However, they are only examples of an actuator and the embodiments of the present disclosure is not limited thereto.

The term "part" may refer to a structure for fixing the actuator to a specific position or a structure that is fixed to the actuator and causes the actuator to move.

The robot according to an embodiment may be any one of an articulated robot, a Scara robot, and a cylindrical robot. An articulated robot may be a robot including one or more joints and parts (or bodies) connecting joints and other joints. A Scara robot may be a robot in which an arm of the robot operates in a specific plane. A cylindrical robot may be a robot in which an arm of the robot has at least one rotating joint and at least one straight joint. However, this is only an example and the spirit of the inventive concept is not limited thereto. Therefore, as described above, a device including one or more actuators and one or more parts, and operating according to a control signal may correspond to the robot of the embodiment.

The robot control device 100 according to an embodiment may be a device for controlling and/or manipulating a robot, and may include a controller 110, a display 120, and an input/output interface 130.

The controller 110 may receive a signal for controlling the robot 200 through the input/output interface 130 or output a signal related to the control of the robot 200. The controller 110 may include devices capable of processing data, such as a processor. Here, the 'processor' may refer to a data processing device embedded in hardware, which has, for example, a circuit physically structured to perform a function represented by codes or instructions included in a program. As an example of the data processing device embedded in the hardware, processing devices such as microprocessors, central processing units (CPUs), processor cores, multiprocessors, application-specific integrated circuits (ASICs), and field programmable gate arrays (FPGAs) may be included, but the scope of the inventive concept is not limited thereto.

The display 120 may display a current operation state of the robot 200. Accordingly, the display 120 may refer to a display device that displays a graphic, a text, or an image. For example, the display 120 may include a cathode ray tube (CRT), a liquid crystal display (LCD), a plasma display panel (PDP), a light-emitting diode (LED), and an organic light emitting diode (OLED). However, the embodiments of the present disclosure is not limited thereto.

The input/output interface 130 may include a plurality of ports as means for receiving a signal for controlling the robot 200 or for outputting a signal related to the control of the robot 200. Here, each port may mean a separate channel (or passage) for transmitting and receiving data between the robot control device 100 and another external device. Each port may transmit and receive data in the form of a logic signal (e.g., High (1) or Low (0)).

Figure 2:
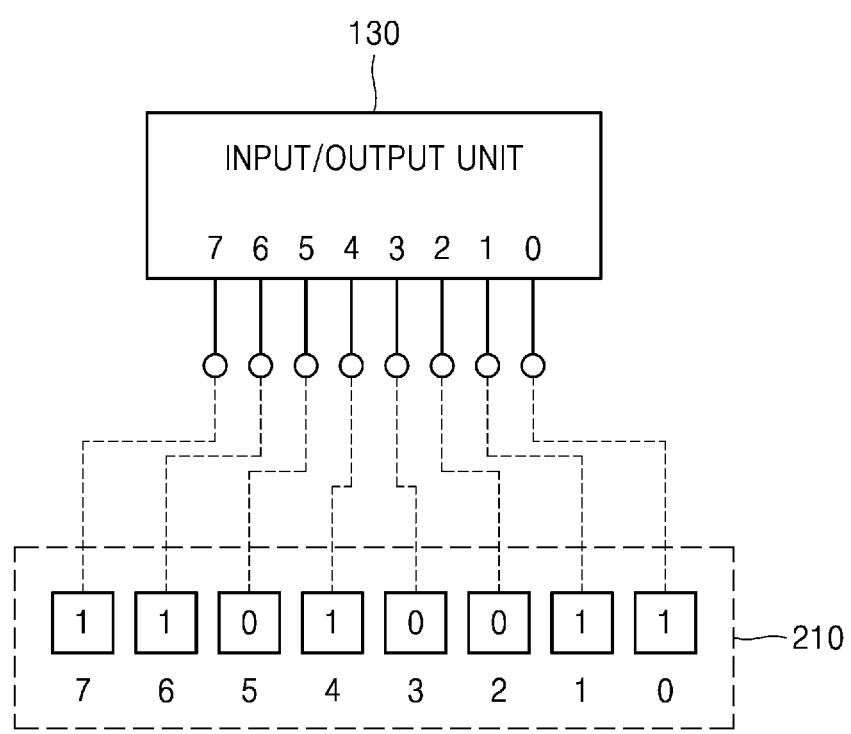
FIG. 2 is a diagram illustrating an example of a signal frame according to an embodiment.

For example, the input/output interface 130 may include eight ports (e.g., ports 0 to 7) as shown in FIG. 2, or may include N ports (where N is a natural number). If there are eight ports of the input/output interface 130 as shown in FIG. 2, the robot control device 100 may transmit data to an external device through the eight channels or receive data from an external device through the eight channels. In addition, the input/output interface 130 may use four of the eight channels to receive data from an external device, and the remaining four channels may be used to transmit data to the external device.

The number of such ports of the input/output interface 130 is generally limited due to the physical size of the robot control device. Therefore, in a related art, if more data transmission and reception channels are required compared to the number of ports included in the input/output interface 130, the robot control device 100 itself may change to another robot control device having more ports, or use a separate extension module in connection with the robot control device 100.

However, the change of a robot control device or the use of a separate extension module not only increases the operating cost of a system, but also increases the complexity of the system, and causes considerable losses by consuming time for reorganizing the system.

According to an embodiment, if the number of data transmission/reception channels required is more than the number of ports included in the robot control device, a limited number of ports may process a large amount of signals by combining a plurality of channels organically without changing a robot control device or using a separate extension module.

The input/output interface 130 according to an embodiment may further include various means for obtaining a user input. For example, the input/output interface 130 may include a keyboard, a mouse, a trackball, a microphone, and a button, or a combination of any one or more thereof. In addition, the input/output interface 130 may further include a touch sensing means for receiving an input from the display 120 described above. However, this is merely an example and the embodiments are not limited thereto.

In addition, the robot control device 100 may further include a communication interface and a memory.

The communication interface may be a device including hardware and software necessary for the robot control device 100 to transmit and receive a control signal through a wired or wireless connection with an external device, such as the robot 200. The communication interface may encode or decode a signal according to a communication protocol with another external device through the port of the input/output interface 130 described above.

The memory may perform a function of temporarily or permanently storing data processed by the robot control device 100. For example, the memory may store a signal received from an external device through the input/output interface 130. The signal stored in the memory may be used to control the motion of the robot 200. For example, the memory may include a magnetic storage media or a flash storage media, but the scope of the inventive concept is not limited thereto.

The robot control device 100 may be a device provided separately from the robot 200 and/or the control device included in the robot 200 as shown in FIG. 1.

In other words, the robot 200 or a control device of the robot 200 may perform a control method of the robot according to an embodiment. However, for convenience of description, hereinafter, it is assumed that the robot control device 100 is separately provided as shown in FIG. 1.

Hereinafter, a method of the robot control device 100 to process N (where N is a natural number) or more control signals using N ports will be mainly described.

The controller 110 of the robot control device 100 according to an embodiment may define an N-bit signal frame composed of a logic signal of each of the N ports included in the input/output interface 130. In other words, the controller 110 may determine which bit of the N-bit signal is to be transmitted through one of the N ports.

FIG. 2 is a diagram illustrating an example of a signal frame 210 according to an embodiment.

Hereinafter, for convenience of description, it may be assumed that the input/output interface 130 includes eight ports (ports 0 to 7). In addition, the signal frame 210 will be described on the premise that the rightmost position is the 0th position and the leftmost position is the seventh position.

As described above, the controller 110 may determine a logic signal of port 0 to be in the 0th position of the signal frame 210, a logic signal of the port 1 to be in the first position of the signal frame 210, a logic signal of the port 2 to be in the second position of the signal frame 210, and so on.

The controller 110 may determine a position of a logic signal of each port in the signal frame 210 based on a user input. In other words, the user may place the logic signals at desired ports in a desired order in the signal frame 210. The user's input may be obtained through a graphical user interface (GUI) displayed on the display 120.

Alternatively, in addition to the user input, the controller 110 may determine the position of the logic signal of each port in the signal frame 210 according to the order of the port, the serial number of the port, etc. However, this is merely illustrative and the embodiments are not limited thereto.

The controller 110 may refer to the order of ports according to the signal frame 210 determined by the above-described process and generate a port setting bit that determines whether to use each of the N ports.

The 'port setting bit' may refer to a bit for determining whether to use a port. Here, 'whether to use a port' does not mean absolute use or non-use of the port, but may mean whether to use the corresponding port according to the method, that is, the method for processing N or more control signals using N ports.

For example, the controller 110 may set the port setting bit for used port to '1', and set the port setting bit for unused ports to '0'.

Such a port setting bit may not be set consistently for adjacent ports. In other words, when following the order of the ports according to the signal frame, the plurality of unused ports may not be adjacent to each other. That is, the port setting bit may be generated as '1111 0000' or may be set as '1010 1010'.

The controller 110 may generate a result bit by performing a bit operation on the logic signal of each of the N ports and the generated port setting bit according to the signal frame 210 determined by the above-described process. As such, the controller 110 may generate a result bit through a bit operation method for each bit.

Figure 3:
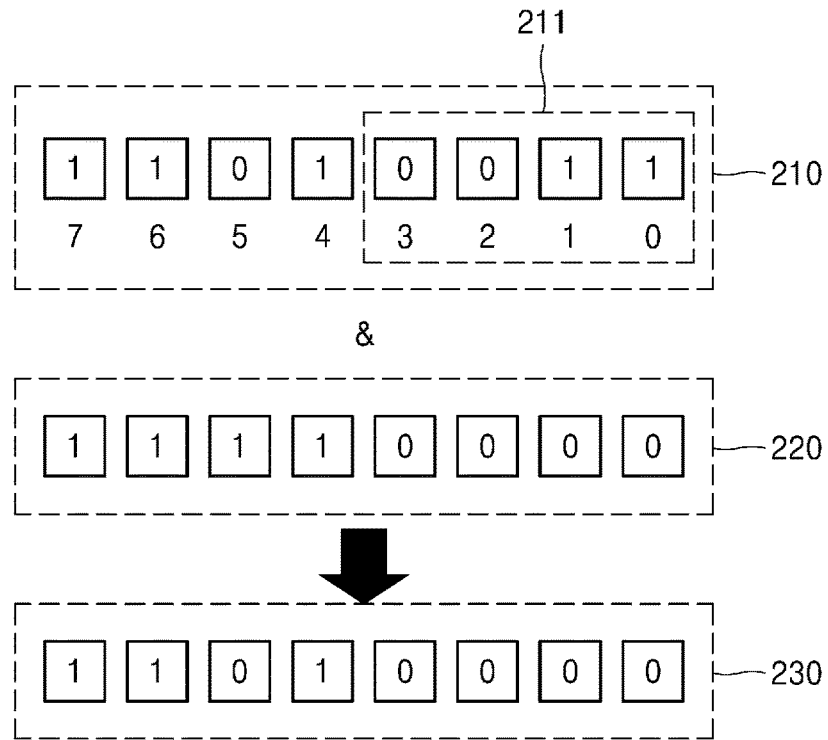
FIG. 3 is a diagram illustrating a method in which a controller generates a result bit by performing a bit operation on a logic signal of each of N ports and a generated port setting bit based on a signal frame according to an embodiment.

FIG. 3 is a diagram illustrating a method in which a controller 110 generates a result bit by performing a bit operation on the logic signal of each of N ports and a generated port setting bit according to a signal frame 210.

Referring to FIG. 3, it may be assumed that logic signals of N ports according to the signal frame 210 is '1101 0011' and the generated port setting bit 220 is '1111 0000'.

For example, the controller 110 may generate a result bit 230 as '1101 0000' by performing a bit operation for each digit.

Referring to FIG. 3, when the port setting bit for the port being used is set to '1' and the port setting bit for the port not being used is set to '0', it may mean that ports 0 to 3 are not being used, and ports 4, 6 and 7 are being used. That is, when the logic signals 211 of ports 0 to 3 are modified to the result bit 230, the result bit 230 reflects the ports being used or not being used. Here, the term 'unused port' may mean that ports are not being used according to configuration of the controller, but it does not mean that the port is absolutely unusable.

The number of bits of the result bit generated by the controller 110 may increase exponentially as the number of used ports increases. In other words, when the number of used ports among the N ports is U (N>=U, where U is a natural number), the result bit may be 2 to the power of U. In the case of FIG. 3, since the number of ports used among the eight ports is four, the number of bits in the result bit may be 2 to the power of 4, that is, 16. Accordingly, the controller 110 may process more than 16 signals, which are more than four, that is, the number of used ports.

As described above, the embodiments may process more signals than the number of ports by merging and using logic signals of a plurality of ports in parallel.

The controller 110 may process a signal based on the result bit 230 generated by the above-described process. For example, if the processing of the signal is 'generating the output signal', the controller 110 may generate an output signal bit by performing a bit operation on the logic signal of each of the N ports, which is generated by an internal operation result, and the port setting bit according to the signal frame.

In addition, if the processing of the signal is 'obtaining the input signal', the controller 110 may generate an input signal bit by performing a bit operation on the logic signal of each of the N ports, which is obtained from an external device, and the port setting bit according to the signal frame.

On the other hand, the controller 110 may separately process a signal for an unused port among the N ports. In other words, the controller 110 may process signals of ports set to a value (e.g., '0') corresponding to a port that the port setting bit does not use among N ports. In this case, the controller 110 may separately process logic signals of ports not used regardless of the above-described signal frame and port setting bit.

For example, referring to FIG. 3, a signal of each of eight ports in the signal frame 210 is '1101 0011' and the generated port setting bit 220 is '1111 0000'.

As described above, the controller 110 may generate a result bit 230 as '1101 0000' by performing a bit operation for each digit.

On the other hand, the controller 110 may separately process the logic signal of a port (port 0 to port 3) in which the port setting bit 220 is set to 0000, as '0', '0', '1', and '1'. That is, the logic signal of each of port 0 to port 3 may be processed regardless of the logic signals of the other ports.

Therefore, it is possible to merge and use the logic signals of a plurality of ports in parallel, simultaneously process more signals than the number of ports, increase the usability of unused ports, and enable the port to be used more efficiently.

Figure 4:
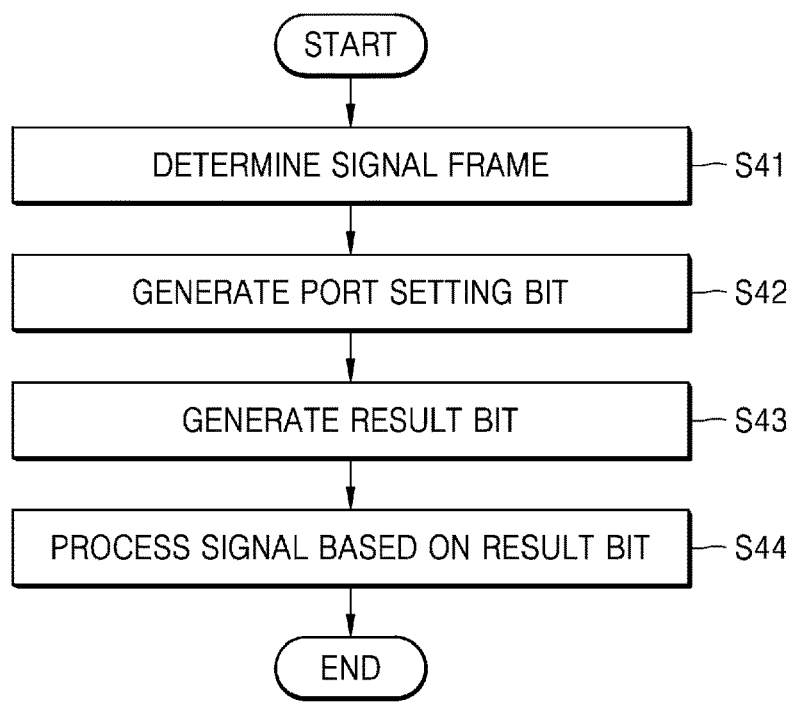
FIG. 4 is a flowchart illustrating a signal processing method performed by a robot control device according to an embodiment.

FIG. 4 is a flowchart illustrating a signal processing method performed by the robot control device 100 according to an embodiment. Hereinafter, detailed descriptions overlapping the descriptions with reference to FIGS. 1 to 3 may be omitted.

The robot control device 100 may determine an N-bit signal frame composed of a logic signal of each of the N ports included in the input/output interface 130 (S41). In other words, the robot control device 100 may determine which bit of the N-bit signal corresponds to a logic signal of a port.

As described with reference to FIG. 2, it may be assumed that the input/output interface 130 includes eight ports (ports 0 to 7). In addition, the signal frame 210 will be described on the premise that the rightmost position is the 0th position and the leftmost position is the 7th position.

As mentioned above, the robot control device 100 may determine a logic signal of port 0 to be in the 0th position of the signal frame 210, a logic signal of the port 1 to be in the first position of the signal frame 210, a logic signal of the port 2 to be in the second position of the signal frame 210, and so on.

In this case, the robot control device 100 may determine a position in the signal frame 210 of the logic signal of each port based on a user input. In other words, the user may place the logic signals at desired ports in a desired order in the signal frame 210. The user's input may be obtained through a graphical user interface (GUI) displayed on the display 120 as described above.

The robot control device 100 may determine the position in the signal frame 210 of the logic signal of each port according to the order of the port, the serial number of the port, etc., in addition to the user's input. However, this is merely illustrative and the embodiments are not limited thereto.

Subsequently, the controller 100 may refer to the order of ports according to the signal frame 210 defined by the above-described process, and generate a port setting bit that determines whether to use each of the N ports (S42).

The 'port setting bit' may mean a bit for determining whether to use a port. Here, 'whether to use a port' does not mean absolute use or non-use of the port, but may mean whether to use the corresponding port according to the method (method for processing N or more control signals using N ports).

For example, the robot control device 100 may set the port setting bit for used port to '1', and set the port setting bit for unused ports to '0'.

Such a port setting bit may not be set consistently for adjacent ports. In other words, when following the order of the ports according to the signal frame, the plurality of unused ports may not be adjacent to each other. That is, the port setting bit may be generated as '1111 0000' or may be set as '1010 1010'.

The robot control device 100 may generate a result bit by performing a bit operation on the logic signal of each of the N ports with the generated port setting bit according to the signal frame 210 determined by the above-described process (S43). As such, the robot control device 100 may generate a result bit through a bit operation method for each bit.

Referring back to FIG. 3, it may be assumed that a signal of N ports according to the signal frame 210 is '1101 0011' and the generated port setting bit 220 is '1111 0000'.

In this case, the robot control device 100 may generate a result bit 230 as '1101 0000' by performing a bit operation for each digit.

When it is assumed that the port setting bit for the used port in FIG. 3 is set to '1' and the port setting bit for the unused port is set to '0', it may mean that ports 0 to 3 are not being used. Therefore, the logic signals 211 of ports 0 to 3 are not reflected in the result bit 230. Here, the term 'unused port' means not to be used according to the method (a method of processing N or more control signals using N ports), but it does not mean that the port is absolutely unusable.

The number of bits of the result bit generated by the robot control device 100 may increase exponentially as the number of ports used increases. In other words, when the number of ports used among the N ports is U (N>=U, where U is a natural number), the result bit may be 2 to the power of U. In the case of FIG. 3, since the number of ports used among the eight ports is four, the number of bits in the result bit may be 2 to the power of 4, that is, 16. Accordingly, the robot control device 100 may process more than 16 signals, which are more than four, that is, the number of ports used.

As described above, the embodiments may process signals of more than the number of ports by merging and using logic signals of a plurality of ports in parallel.

The robot control device 100 may process a signal based on the result bit 230 generated by the above-described process (S44). For example, if the processing of the signal is 'generating the output signal', the robot control device 100 may generate an output signal bit by performing a bit operation on the logic signal of each of the N ports, which is generated by an internal operation result, and the port setting bit according to the signal frame.

In addition, if the processing of the signal is 'obtaining the input signal', the robot control device 100 may generate an input signal bit by performing a bit operation on the logic signal of each of the N ports, which is obtained from an external device, and the port setting bit according to the signal frame.

On the other hand, the robot control device 100 may separately process a signal for an unused port among the N ports. In other words, the robot control device 100 may process signals of ports set to a value (e.g., '0') corresponding to a port that the port setting bit does not use among N ports. In this case, the robot control device 100 may separately process logic signals of ports not being used regardless of the above-described signal frame and the port setting bit.

For example, referring to FIG. 3, a signal of each of eight ports in the signal frame 210 is '1101 0011' and the generated port setting bit 220 is '1111 0000'.

In this case, the robot control device 100 may generate a result bit 230 as '1101 0000' by performing a bit operation for each digit.

On the other hand, the robot control device 100 may separately process the logic signal of a port (port 0 to port 3) in which the port setting bit 220 is set to 0000, as '0', '0', '1', and '1'. That is, the logic signal of each of port 0 to port 3 may be processed regardless of the logic signals of the other ports.

Therefore, it is possible to merge and use the logic signals of a plurality of ports in parallel, simultaneously process signals of more than the number of ports, increase the usability of unused ports, and enable the port to be used more efficiently.

The signal processing method may be implemented as computer readable codes on a computer readable recording medium. The computer-readable recording medium may be any data storage device that can store data, which can be read by a computer. Examples of the computer-readable recording medium include ROM, RAM, CD-ROM, magnetic tape, floppy disk, optical data storage, and the like. In addition, the computer-readable recording medium may be distributed over a networked computer system so that code readable by the computer in a distributed fashion may be stored and executed. In addition, functional programs, codes, and code segments for implementing the present disclosure can be easily inferred by programmers in the art.

Although the embodiments have been described with reference to the accompanying drawings, they are merely examples, and those skilled in the art will understand that various modifications and equivalent embodiments may be derived from the above embodiments.

What is claimed is:

1. A method of processing control signals using a plurality of ports of a robot control device, the method comprising:
   determining a logic signal of each of the plurality of ports corresponding to an N-bit signal frame;
   generating a port setting bit for determining whether to use each of the plurality of ports corresponding to the N-bit signal frame based on an order of the plurality of ports, N being a natural number;
   generating a result bit by performing a bit operation on the logic signal of each of the plurality of ports and the port setting bit; and
   processing a first signal based on the result bit,
   wherein a number of the plurality of ports is N, and
   wherein, when a number of ports being used among the plurality of ports is U, where U is a natural number and N is greater than or equal to U, the result bit is 2 to a power of U.

2. The method of claim 1, wherein the generating of the port setting bit comprises:
   generating the port setting bit as 1 for indicating a used port among the plurality of ports, and
   generating the port setting bit as 0 for indicating an unused port among the plurality of ports.

3. The method of claim 1, further comprising, after the processing of the first signal, processing a second signal by an unused port among the plurality of ports.

4. The method of claim 3, wherein the processing of the second signal by the unused port comprises separately processing by each of a plurality of unused ports regardless of the N-bit signal frame and the port setting bit.

5. The method of claim 3, wherein a plurality of unused ports are not adjacent to each other.

6. The method of claim 1, wherein the processing of the first signal further comprises generating an output signal, and
   wherein the generating of the result bit further comprises generating an output signal bit by performing the bit operation on the logic signal of each of the plurality of ports generated internally and the port setting bit.

7. The method of claim 1, wherein the processing of the first signal is obtaining of an input signal, wherein the generating of the result bit further comprises generating an input signal bit by performing the bit operation on the logic signal of each of the plurality of ports obtained from an external device and the port setting bit.

8. A non-transitory computer readable medium storing a program, when executed by a computer, configured to perform the method of claim 1.

9. A robot control device for processing control signals using a plurality of ports, the robot control device comprising:

a controller configured to:

determine a logic signal of each of the plurality of ports corresponding to an N-bit signal frame, N being a natural number;

generate a port setting bit for determining whether to use each of the plurality of ports corresponding to the N-bit signal frame based on an order of the plurality of ports;

generate a result bit by performing a bit operation on the logic signal of each of the plurality of ports and the port setting bit; and process a first signal based on the result bit wherein a number of the plurality of ports is N, and wherein, when a number of ports being used among the plurality of ports is U, where U is a natural number and N is greater than or equal to U, the result bit is 2 to a power of U.

10. The robot control device of claim 9, wherein the controller is further configured to:

generate the port setting bit as 1 for indicating a used port among the plurality of ports, and generate the port setting bit as 0 for indicating an unused port among the plurality of ports.

11. The robot control device of claim 9, wherein the controller is further configured to process a second signal by an unused port among the plurality of ports after processing the first signal.

12. The robot control device of claim 11, wherein the controller is further configured to separately process each of a plurality of unused ports regardless of the N-bit signal frame and the port setting bit.

13. The robot control device of claim 11, wherein a plurality of unused ports are not adjacent to each other.

14. The robot control device of claim 9, wherein the controller is further configured to:

generate an output signal; and generate an output signal bit by performing the bit operation on the logic signal of each of the plurality of ports generated internally and the port setting bit.

15. The robot control device of claim 9, wherein the controller is further configured to:

obtain an input signal; and generate an input signal bit by performing the bit operation on the logic signal of each of the plurality of ports obtained from an external device and the port setting bit.

* * * * *